US012436507B2

(12) United States Patent
Fujisawa

(10) Patent No.: US 12,436,507 B2
(45) Date of Patent: Oct. 7, 2025

(54) ELECTRONIC WATCH HAVING IMPROVED ANTENNA FUNCTION

(71) Applicant: SEIKO EPSON CORPORATION, Tokyo (JP)

(72) Inventor: Teruhiko Fujisawa, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 330 days.

(21) Appl. No.: 18/083,906

(22) Filed: Dec. 19, 2022

(65) Prior Publication Data

US 2023/0195051 A1 Jun. 22, 2023

(30) Foreign Application Priority Data

Dec. 20, 2021 (JP) ................................ 2021-206441

(51) Int. Cl.

| | |
|---|---|
| ***G04R 60/12*** | (2013.01) |
| ***G04G 21/04*** | (2013.01) |
| ***H01Q 1/27*** | (2006.01) |
| ***H01Q 9/04*** | (2006.01) |

(52) U.S. Cl.

CPC ............. *G04R 60/12* (2013.01); *G04G 21/04* (2013.01); *H01Q 1/273* (2013.01); *H01Q 9/0407* (2013.01)

(58) Field of Classification Search

CPC ........ G04R 60/12; G04G 21/04; H01Q 1/273; H01Q 9/0407

USPC ........................................................... 368/10

See application file for complete search history.

(56) References Cited

U.S. PATENT DOCUMENTS

| | | | | |
|---|---|---|---|---|
| 2016/0103429 | A1 * | 4/2016 | Fujisawa | G04B 19/247 368/278 |
| 2018/0284700 | A1 * | 10/2018 | Nakajima | H01Q 9/0407 |
| 2019/0265655 | A1 * | 8/2019 | Naka | H01Q 5/378 |
| 2020/0052370 | A1 * | 2/2020 | Aizawa | G04R 60/12 |
| 2020/0089170 | A1 | 3/2020 | Kitamura et al. | |
| 2020/0262740 | A1 * | 8/2020 | Borges-Machado | C03C 21/008 |
| 2021/0091471 | A1 | 3/2021 | Yamamoto | |

FOREIGN PATENT DOCUMENTS

| | | | |
|---|---|---|---|
| CN | 110431494 | A | 11/2019 |
| JP | 2017-020925 | A | 1/2017 |
| JP | 2018-040749 | A | 3/2018 |

(Continued)

*Primary Examiner* — Regis J Betsch
*Assistant Examiner* — Kevin Andrew Johnston
(74) *Attorney, Agent, or Firm* — Harness, Dickey & Pierce, P.L.C.

(57) ABSTRACT

An electronic watch includes a case having electrical conductivity, a cover member attached to the case, a hand, a hand shaft to which the hand is attached, and an antenna disposed to overlap the cover member in plan view from a first direction, the antenna being configured to receive a predetermined radio wave, the cover member is made of a material that shortens a wavelength of the radio wave, the case includes a facing surface facing a side surface of the cover member, the facing surface being located within a predetermined dimension from the side surface, and in the first direction, a height dimension from an end portion of the facing surface positioned farthest from the antenna to a farthest portion of the cover member positioned farthest from the antenna is equal to or greater than 1/60 of the wavelength shortened by the cover member.

7 Claims, 13 Drawing Sheets

(56) References Cited

FOREIGN PATENT DOCUMENTS

| | | | | | |
|---|---|---|---|---|---|
| JP | 2021-047144 | A | | 3/2021 | |
| WO | 2018-016574 | A1 | | 1/2018 | |
| WO | WO-2018168852 | A1 | * | 9/2018 | ............. G04G 17/06 |

* cited by examiner

ELECTRONIC WATCH HAVING IMPROVED ANTENNA FUNCTION

The present application is based on, and claims priority from JP Application Serial Number 2021-206441, filed Dec. 20, 2021, the disclosure of which is hereby incorporated by reference herein in its entirety.

BACKGROUND

1. Technical Field

The present disclosure relates to an electronic watch incorporating an antenna.

2. Related Art

In small electronic watches such as a wristwatch, an antenna built-in type electronic watch that incorporates an antenna that receives satellite signals is known (see JP-A-2021-47144).

An electronic watch disclosed in JP-A-2021-47144 includes a watch case, a dial and a dial ring that are disposed within the watch case, and an antenna. The watch case includes a case band and a bezel that are made of a conductive material and a cover glass attached to the bezel.

The fact that at least one of the dial, the dial ring, and the cover glass is a dielectric that is disposed at a front surface side of the watch from the antenna and that is disposed within a predetermined distance set according to a wavelength of radio waves to be received by the antenna with respect to the antenna is disclosed.

In the electronic watch, when a holding surface of the watch case holding the cover glass is formed of a conductive material, reception sensitivity may deteriorate due to an effect of the case.

SUMMARY

An electronic watch according to the present disclosure includes a case having electrical conductivity, a cover member attached to the case, a hand, a hand shaft to which the hand is attached, and an antenna disposed to overlap the cover member in plan view from a first direction parallel to an axial direction of the hand shaft, the antenna being configured to receive a predetermined radio wave, the cover member is made of a material that shortens a wavelength of the radio wave, the case includes a facing surface facing a side surface of the cover member, the facing surface being disposed within a predetermined dimension from the side surface, and in the first direction, a height dimension from an end portion of the facing surface positioned farthest from the antenna to a farthest portion of the cover member positioned farthest from the antenna is equal to or greater than 1/60 of the wavelength shortened by the cover member.

An electronic watch according to the present disclosure includes a case having electrical conductivity, a cover member attached to the case, a hand, a hand shaft to which the hand is attached, and an antenna disposed to overlap the cover member in plan view from a first direction parallel to an axial direction of the hand shaft, the antenna being configured to receive a predetermined radio wave, the cover member is made of a material that shortens a wavelength of the radio wave, the case includes a facing surface facing a side surface of the cover member, the facing surface being disposed within a predetermined dimension from the side surface, and a recessed portion opened to the facing surface and a front surface of the case, the recessed portion is disposed with a decorative plate having no electrical conductivity, and in the first direction, a farthest portion of the cover member positioned farthest from the antenna is positioned farther from the antenna than an end portion of the facing surface positioned farthest from the antenna.

DESCRIPTION OF EXEMPLARY EMBODIMENTS

First Embodiment

An electronic watch 1 according to a first embodiment will be described below with reference to the drawings. In the present embodiment, a cover glass 15 side of the electronic watch 1 will be referred to as a front surface side or an upper side, and a case back 14 side will be referred to as a back surface side or a lower side.

The electronic watch 1 according to the present embodiment incorporates a planar antenna 50, which will be described below, and is configured to receive satellite signals from a plurality of position information satellites such as GPS satellites and quasi-zenith satellites that travel on predetermined orbits above the earth to obtain satellite time information, and configured to be capable of correcting internal time information.

Figure 1:
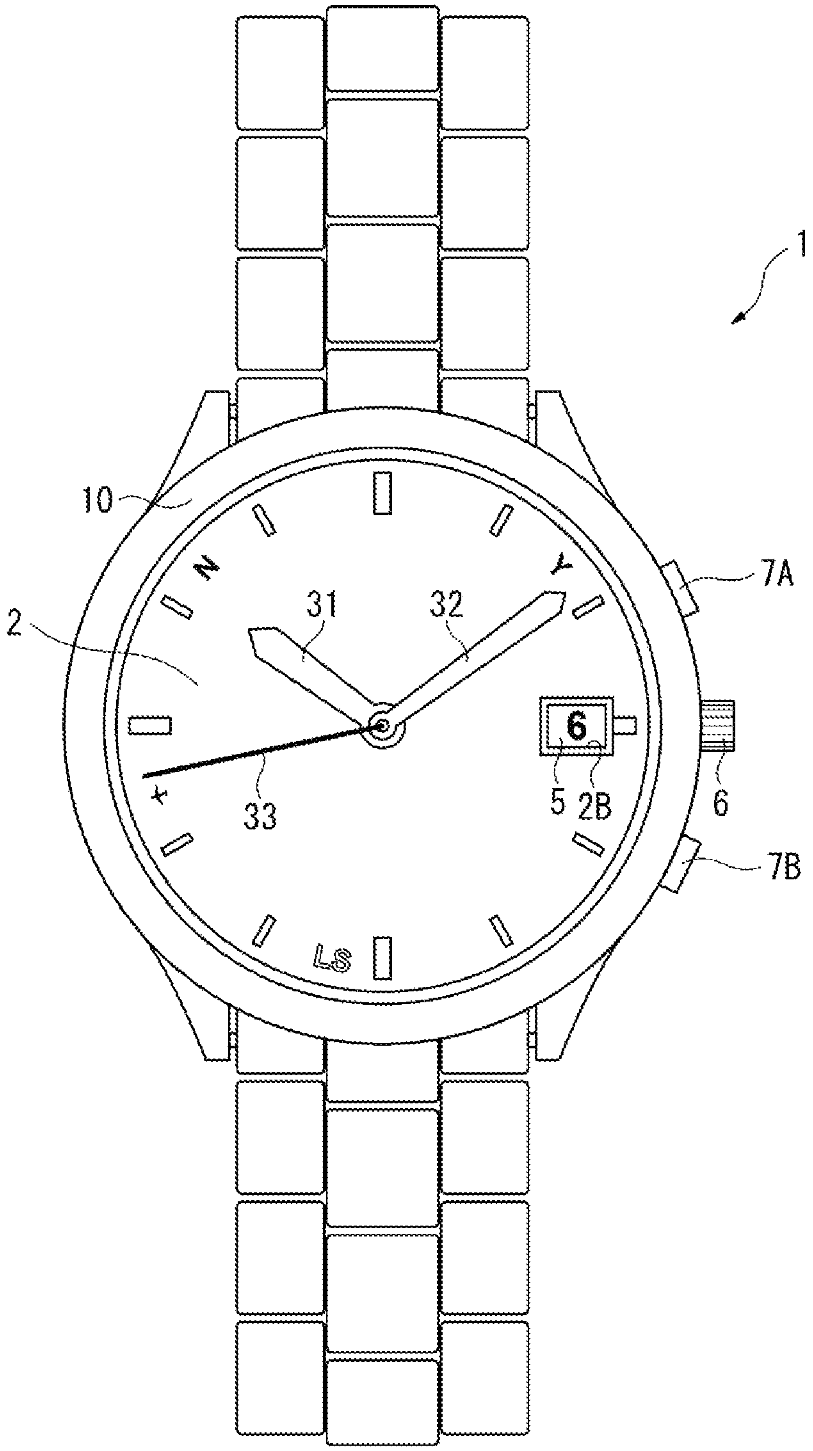
FIG. 1 is a front view illustrating an electronic watch according to a first embodiment.
Figure 2:
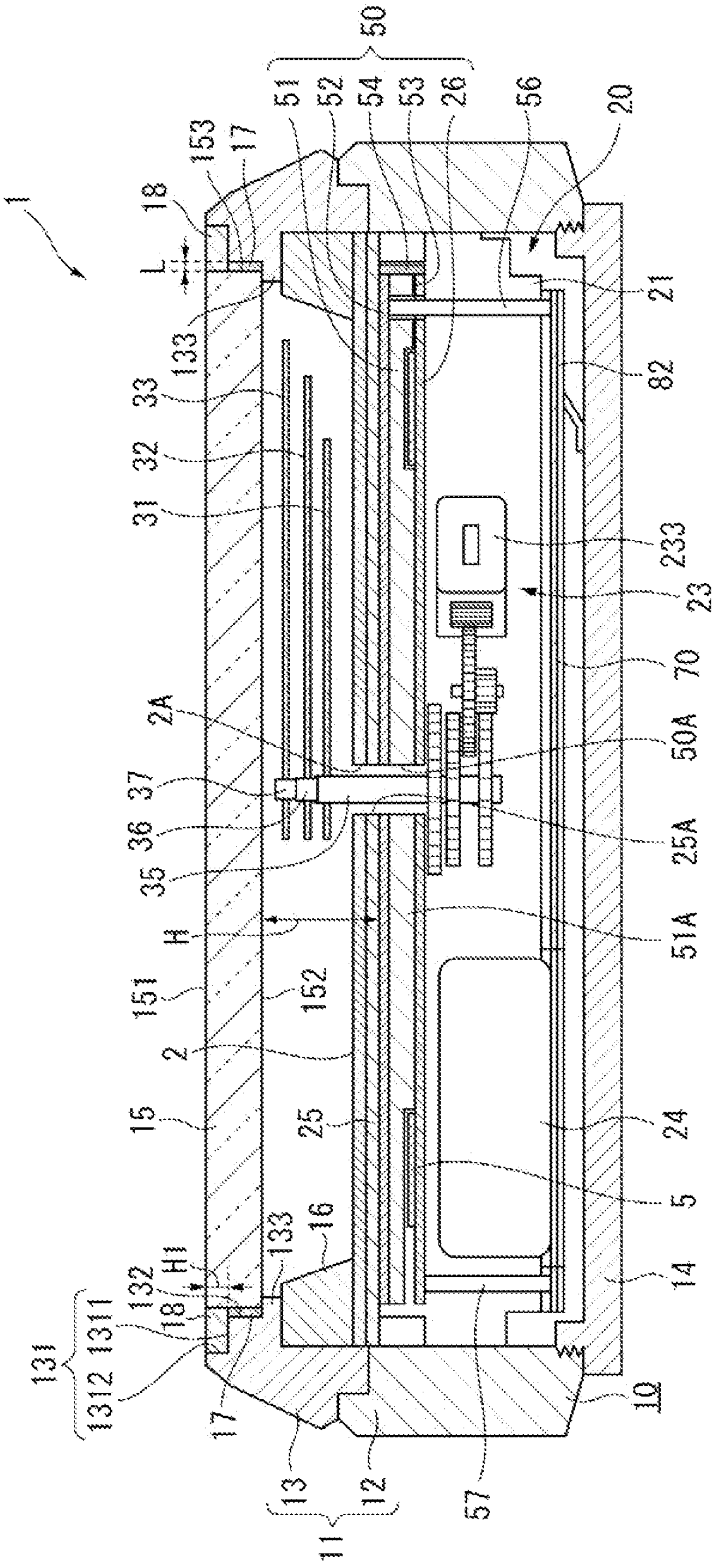
FIG. 2 is a cross-sectional view illustrating the electronic watch.

As illustrated in FIG. 1 and FIG. 2, the electronic watch 1 includes a case 10 that accommodates a dial 2, a movement 20, an hour hand 31, a minute hand 32, a seconds hand 33, the planar antenna 50, and the like. Further, the electronic watch 1 includes a crown 6 for external operation, and two buttons 7A and 7B.

The dial 2 is formed of a non-conductive member in a disk shape. The dial 2 according to the present embodiment is formed of polycarbonate resin having a relative permittivity of 3.

A through hole 2A is formed at the center of a flat surface of the dial 2, and three hand shafts 35, 36, and 37 coaxially provided are disposed in the through hole 2A. The hour hand 31 is attached to the hand shaft 35, the minute hand 32 is attached to the hand shaft 36, and the seconds hand 33 is attached to the hand shaft 37. The hand shafts 35, 36, and 37 and the hour hand 31, the minute hand 32, and the seconds hand 33 are constituted by conductive members made of metal.

A date window 2B having a rectangular shape is provided at a position of 3 o'clock of the dial 2. A date indicator 5 is disposed at the back surface side of the dial 2, and the date indicator 5 can be seen from the date window 2B. The hour hand 31, the minute hand 32, the seconds hand 33, and the date indicator 5 are driven through step motors and train wheels, which will be described below.

In the present embodiment, a direction orthogonal to the surface of the dial 2, in other words, the axial direction of the hand shafts 35 to 37 is defined as a first direction, and a direction orthogonal to the first direction is defined as a second direction. Additionally, in the present embodiment, plan view means that the electronic watch 1 is viewed from the first direction, and side view means that the electronic watch 1 is viewed from the second direction.

Outer Packaging Structure of Electronic Watch

The case 10 includes a case body 11 and the case back 14. The case body 11 includes a case band 12 having a cylindrical shape, and a bezel 13 having a ring shape and provided at the front surface side of the case band 12. Note that in the present embodiment, the case band 12 and the case back 14 are separately configured, but are not limited to this configuration, and a one-piece case in which the case band 12 and the case back 14 are integrated may be used. In addition, in the present embodiment, the case band 12 and the bezel 13 are separately configured, but are not limited to this configuration, and a structure in which the case band 12 and the bezel 13 are integrated may be used, and this structure has a merit of being manufactured at low cost.

Materials of the case band 12, the bezel 13, the case back 14 are metal materials such as stainless steel, titanium alloy, aluminum, or brass, that is, conductive materials.

The cover glass 15 as a cover member is attached to the bezel 13 of the case 10. The cover glass 15 is formed in a disk shape, and the front surface, that is, an upper surface 151, and the back surface, that is, a lower surface 152, are flat surfaces parallel to the second direction. Hereinafter, a cover glass having the upper surface and the lower surface that are parallel to the second direction is referred to as a flat plate glass. Also, the cover glass 15 is manufactured by using a transparent material such as mineral glass, sapphire glass, and organic glass. The mineral glass is glass made from silica (silicon dioxide: $SiO_2$), the sapphire glass is glass made from alumina (aluminum oxide: $Al_2O_3$), and the organic glass is a synthetic resin material such as acrylic. The cover glass 15 according to the present embodiment is made of sapphire glass having a plate shape. The sapphire glass has a relative permittivity of about from 9 to 11, and is formed by using single crystal sapphire made of alumina with high purity. The sapphire glass has features that it is hard to be scratched because of its high hardness, has a processed surface being very smooth and excellent in optical transparency, and has high visibility.

A glass diameter, which is a diameter of the cover glass 15, is determined by a size of the electronic watch 1, and a thickness dimension of the cover glass 15 is determined by a relationship between the glass diameter and waterproof performance. For example, when the waterproof specification of the electronic watch 1 is 10 atmospheres water-resistant, the thickness dimension of the cover glass 15 is approximately 1.5 mm, and when the waterproof specification is 20 atmospheres water-resistant, the thickness dimension of the cover glass 15 is approximately from 2.6 to 2.8 mm. The electronic watch 1 according to the present embodiment has the waterproof specification of 20 atmospheres water-resistant, so that the thickness dimension of the cover glass 15 is from 2.6 to 2.8 mm. The thickness dimension of the cover glass 15 is constant, and thus, matches the maximum thickness dimension. Due to this, the maximum thickness dimension of the cover glass 15 is from 2.6 to 2.8 mm, and as will be described below, is equal to or greater than 1/30 of the wavelength shortened by the cover glass 15, that is, equal to or greater than 2.0 mm. Additionally, the side surface 153 of the cover glass 15 is a circumferential surface parallel to the first direction.

Internal Structure of Electronic Watch

Next, an internal structure incorporated into the case 10 of the electronic watch 1 will be described.

As illustrated in FIG. 2, in addition to the dial 2, a dial ring 16, a movement 20, and the like are accommodated in the case 10.

The dial ring 16 is made of a non-conductive member in a manner similar to that of the dial 2 in a ring shape in plan view, and is disposed along the outer circumference of the dial 2. The dial ring 16 according to the present embodiment is formed of polycarbonate resin having a relative permittivity of 3.

The dial ring 16 covers the upper surface of the outer circumference of the dial 2, and the outer circumference of the dial 2 is not visually recognized due to the dial ring 16.

Figure 3:
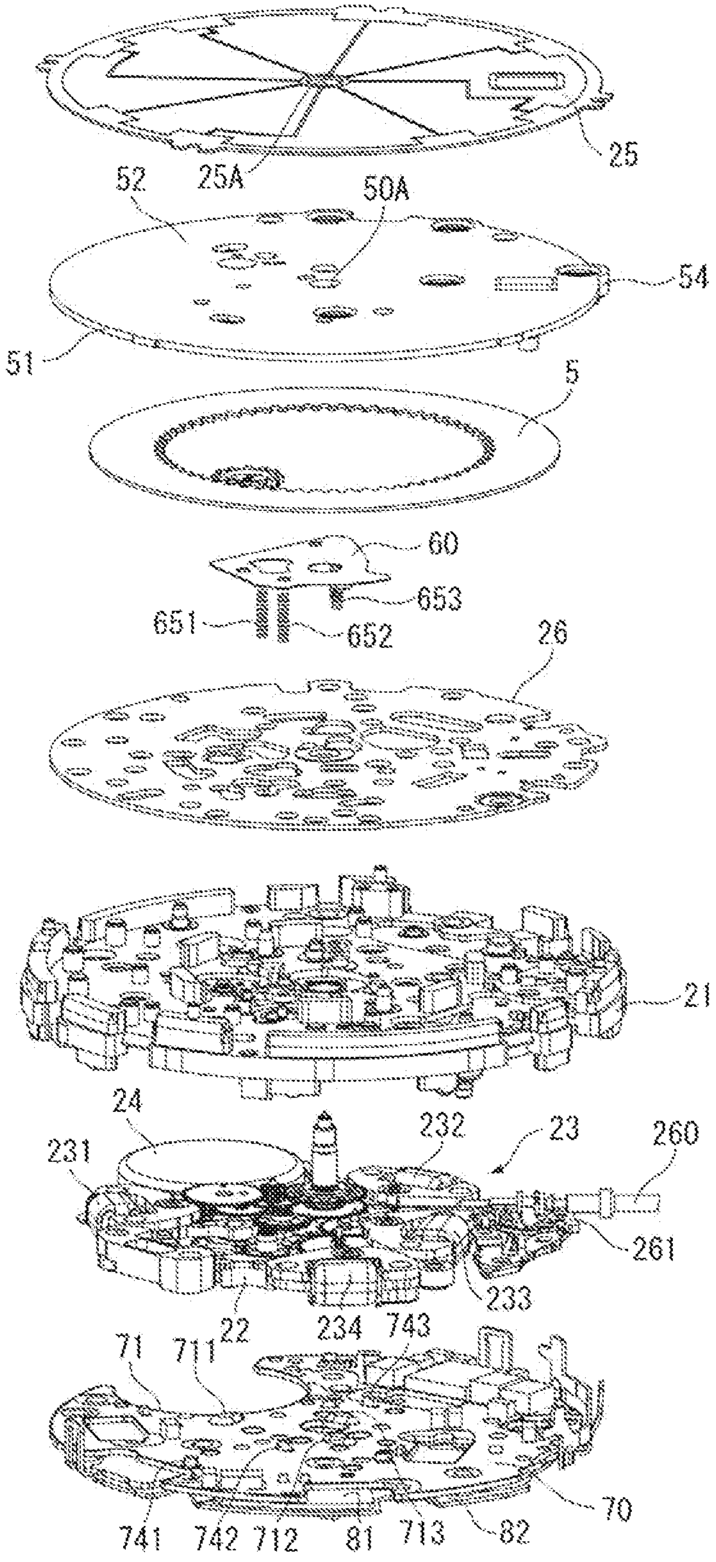
FIG. 3 is an exploded perspective view illustrating essential parts of the electronic watch.
Figure 4:
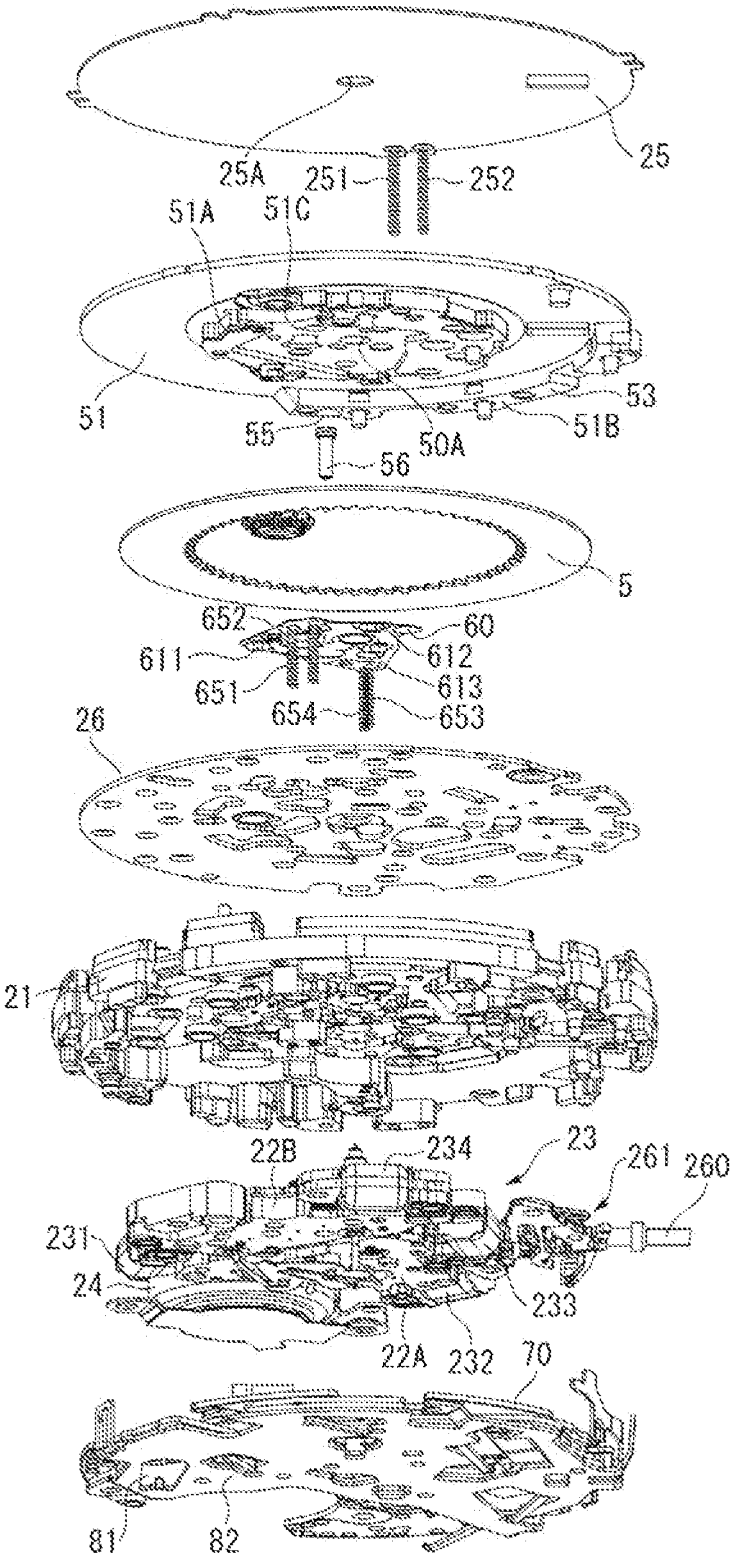
FIG. 4 is an exploded perspective view illustrating the essential parts of the electronic watch.

As illustrated in FIG. 2, FIG. 3, and FIG. 4, the movement 20 includes the date indicator 5, a main plate 21, a train wheel bridge 22, a drive mechanism 23, a secondary battery 24, a solar panel 25, a first magnetic shield plate 26 also serving as an hour wheel holder, the planar antenna 50, an LED substrate 60, a printed wired board 70, a second magnetic shield plate 81, a circuit holder 82, and the like. Note that in FIG. 2, illustration of the date indicator 5, the train wheel bridge 22, the first magnetic shield plate 26, the LED substrate 60, and the second magnetic shield plate 81 is omitted.

The main plate 21 is formed of a non-conductive member such as plastic. As illustrated in FIG. 3 and FIG. 4, the solar panel 25, the planar antenna 50, the date indicator 5, the LED substrate 60, and the first magnetic shield plate 26 are disposed between the main plate 21 and the dial 2. In other words, the solar panel 25 is disposed at the back surface side, which is the surface at the main plate 21 side of the dial 2, the planar antenna 50 is disposed at the back surface side of the solar panel 25, the date indicator 5 and the LED substrate 60 are disposed at the back surface side of the planar antenna 50, and the first magnetic shield plate 26 is disposed at the back surface side of the date indicator 5 and the LED substrate 60.

The train wheel bridge 22, the drive mechanism 23, the secondary battery 24, the printed wired board 70, and the second magnetic shield plate 81, and the circuit holder 82 are disposed between the main plate 21 and the case back 14.

As illustrated in FIG. 4, the train wheel bridge 22 includes two train wheel bridges of a first train wheel bridge 22A supporting a train wheel that drives the hour hand 31, the minute hand 32, and the seconds hand 33, and a second train wheel bridge 22B supporting a train wheel that drives the date indicator 5. However, a train wheel bridge integrally formed may be provided.

The drive mechanism 23 is attached to the back surface of the main plate 21, and drives the hour hand 31, the minute hand 32, the seconds hand 33, and the date indicator 5. That is, as illustrated in FIG. 3, the drive mechanism 23 includes a first step motor 231 that drives the hour hand 31 and a first train wheel, a second step motor 232 that drives the minute hand 32 and a second train wheel, a third step motor 233 that drives the seconds hand 33 and a third train wheel, and a fourth step motor 234 that drives the date indicator 5 and a fourth train wheel. Note that the first train wheel includes the hand shaft 35 to which the hour hand 31 is attached. The second train wheel includes the hand shaft 36 to which the minute hand 32 is attached. The third train wheel includes the hand shaft 37 to which the seconds hand 33 is attached.

In the movement 20, a winding stem 260 coupled to the crown 6 is disposed at the position of 3 o'clock of the dial 2, and a switching mechanism 261 such as a setting lever is disposed around the winding stem 260. Additionally, the step motors 231 to 234 are disposed at positions that do not overlap the secondary battery 24 in the plan view.

As illustrated in FIG. 3, the main plate 21 and the drive mechanism 23 are disposed between the LED substrate 60 and the printed wired board 70. Additionally, the second magnetic shield plate 81 and the circuit holder 82 are disposed at the back surface of the printed wired board 70.

As illustrated in FIG. 4, three light-emitting elements 611, 612, and 613 constituted by light-emitting diodes are mounted at a back surface of the LED substrate 60 facing the main plate 21.

Circuit elements such as semiconductor integrated circuits (IC), resistors, and capacitors are mounted at both the front surface and the back surface of the printed wired board 70. Then, as illustrated in FIG. 3, three photoreceptor elements 711, 712, and 713 constituted by phototransistors, and circuit elements 741, 742, and 743 are mounted at the front surface of the printed wired board 70, that is, at the surface at the dial 2 side.

The light-emitting elements 611 to 613, and the photoreceptor elements 711 to 713 are used for hand position detection of the respective hands.

In the present embodiment, a power supply voltage VDD with a high potential and a power supply voltage VSS with a low potential are supplied to the printed wired board 70 through the secondary battery 24 and a constant voltage circuit, which is not illustrated. In addition, in the present embodiment, the power supply voltage VDD is a ground potential. Note that the power supply voltage VSS may be the ground potential.

The LED substrate 60 and the printed wired board 70 are electrically coupled by using conduction members 651, 652, 653, and 654 each of which is constituted by a coil spring, so that power is supplied to the light-emitting elements 611, 612, and 613.

The secondary battery 24 is a button type lithium ion battery formed in a flat circular shape, as illustrated in FIG. 3, and is disposed in a cut-out portion 71 of the printed wired board 70.

The solar panel 25 is a solar cell panel to be used for a wristwatch, and for example, a film type solar cell obtained by layering amorphous silicon films at a resin film substrate or the like can be used. The solar panel 25 includes a through hole 25A through which the hand shafts 35 to 37 are inserted and two electrode terminals. As illustrated in FIG. 4, the electrode terminals and the printed wired board 70 are made conductive by using the coil springs 251 and 252. Thus, a current generated by the solar panel 25 is charged to the secondary battery 24 through the coil springs 251 and 252, and the printed wired board 70.

Planar Antenna

The planar antenna 50 is an antenna that receives satellite signals from GPS satellites, and in the present embodiment, is constituted by a planar inverted-F antenna.

The planar antenna 50 is disposed so as to overlap the cover glass 15 in plan view. Additionally, as illustrated in FIG. 2, the planar antenna 50 includes a dielectric substrate 51, a first conductor element 52 having a plate shape, a second conductor element 53 disposed so as to overlap the first conductor element 52 in plan view, a short-circuit portion 54 that short-circuits the first conductor element 52 and the second conductor element 53, and the first magnetic shield plate 26 having a plate shape and disposed so as to overlap the first conductor element 52 in plan view. The first conductor element 52 and the second conductor element 53 may be formed of a sheet metal such as copper, or an iron alloy, but in the present embodiment, are constituted by metal coating films formed at the surfaces of the dielectric substrate 51. The metal coating films can be formed by a plating process by using, for example, copper, silver, nickel, aluminum, or the like. Note that any one of the first conductor element 52 and the second conductor element 53 may be made of metal, and the other may be configured by performing metal coating on a substrate. The first magnetic shield plate 26 is a conductor plate obtained by coating a pure iron plate with a nickel film, and is in contact with the second conductor element 53 as will be described below. The first conductor element 52 functions as a radiation member of the planar inverted-F antenna, and the second conductor element 53 and the first magnetic shield plate 26 function as a ground member of the planar inverted-F antenna.

Figure 5:
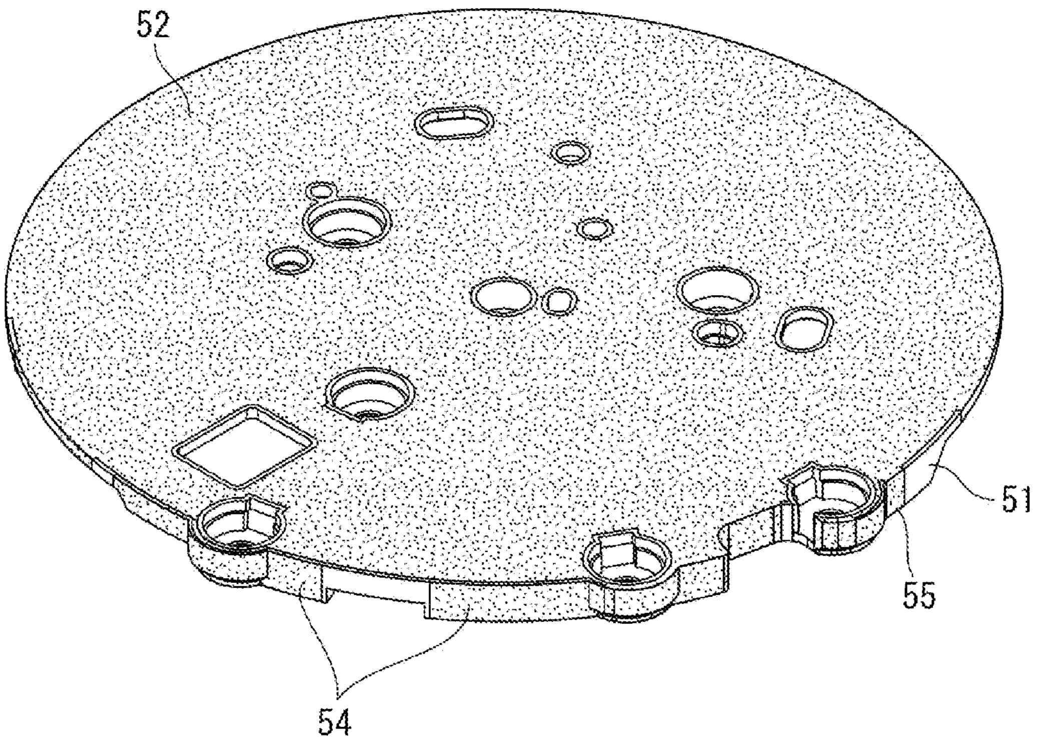
FIG. 5 is a perspective view illustrating a main portion of a planar antenna of the electronic watch.
Figure 6:
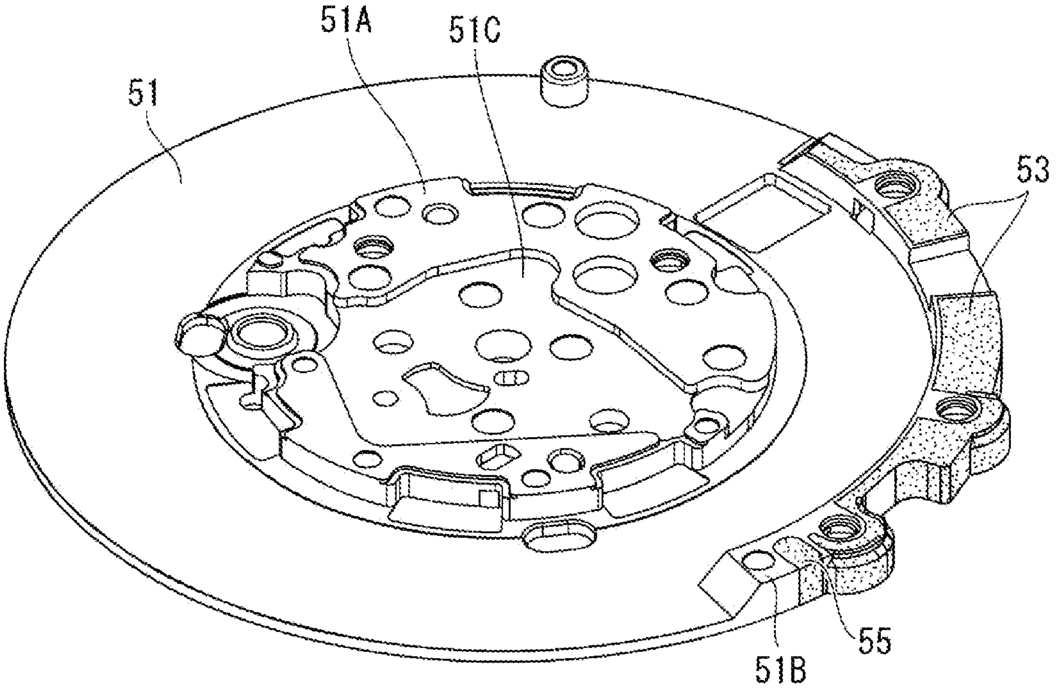
FIG. 6 is a perspective view illustrating the main portion of the planar antenna of the electronic watch.

As illustrated in FIG. 5 and FIG. 6, the planar antenna 50 according to the present embodiment includes the dielectric substrate 51 made of synthetic resin and serving as an antenna substrate, and is formed with the first conductor element 52 at the front surface of the dielectric substrate 51, that is, the surface at the solar panel 25 side, and is formed with the second conductor element 53 at the back surface of the dielectric substrate 51, that is, the surface at the main plate 21 side. Also, the short-circuit portion 54 that short-circuits the first conductor element 52 and the second conductor element 53 is layered at the side surface of the dielectric substrate 51. The first conductor element 52 is formed over substantially the entire front surface of the dielectric substrate 51.

When a material of the dielectric substrate 51 is any one of polyphenylene sulfide, liquid crystal polymer, and polycarbonate, electroless plating can be easily applied, and the relative permittivity can be increased, so that the appropriate antenna substrate can be made.

The configuration of the planar antenna 50 according to the present embodiment will be specifically described based on FIG. 3 to FIG. 6. A through hole 50A through which the hand shafts 35 to 37 are inserted is formed at a center position of the plane of the planar antenna 50. That is, the through hole 50A is formed so as to penetrate through the first conductor element 52, the dielectric substrate 51, and the second conductor element 53 that have plate shapes.

A protruding portion is formed at the back surface of the dielectric substrate 51, that is, a surface at the main plate 21 side. The protruding portion includes an inner circumferential protruding portion 51A formed at a position at the inner circumferential side of the date indicator 5 in plan view and an outer circumferential protruding portion 51B formed at a position at the outer circumferential side of the date indicator 5. The dielectric substrate 51 has a function of pressing the date indicator 5 against the main plate. A recessed portion 51C in which the LED substrate 60 is disposed is formed in the inner circumferential protruding portion 51A. Additionally, the second conductor element 53 is layered at the lowermost surface of the outer circumferential protruding portion 51B.

Furthermore, a power feed terminal 55 is formed at the outer circumferential protruding portion 51B so as to be spaced apart from the second conductor element 53. The power feed terminal 55 is made conductive with the first conductor element 52 through the side surface of the dielectric substrate 51.

One end of a power feed element 56 is in contact with the power feed terminal 55. The other end of the power feed element 56 is in contact with the printed wired board 70, and is made conductive with a reception IC mounted on the printed wired board 70. Note that in FIG. 2, the power feed element 56 is schematically illustrated so as to penetrate through the first magnetic shield plate 26 and the dielectric substrate 51 to come into contact with the first conductor element 52, but in practice, as illustrated in FIG. 3 to FIG. 6, the configuration is adopted in which the power feed terminal 55 of the first conductor element 52 extends to the lower surface through the side surface of the dielectric substrate 51, and the upper end of the power feed element 56 comes into contact with the power feed terminal 55.

The second conductor element 53 layered at the lowermost surface of the outer circumferential protruding portion 51B is in contact with the front surface of the first magnetic shield plate 26 made of metal. The second conductor element 53 and the first magnetic shield plate 26 are made conductive with a ground terminal of the printed wired board 70 through a coupling element 57, and function as the ground member of the planar inverted-F antenna as described above. Furthermore, since the first magnetic shield plate 26 is made of metal, the first magnetic shield plate 26 also serves as a magnetic shield plate covering the dial 2 side of the step motors 231 to 234.

Such a planar antenna 50 also serves as a support substrate that supports the solar panel 25 made of a film.

Circuit Configuration of Electronic Watch

Figure 7:
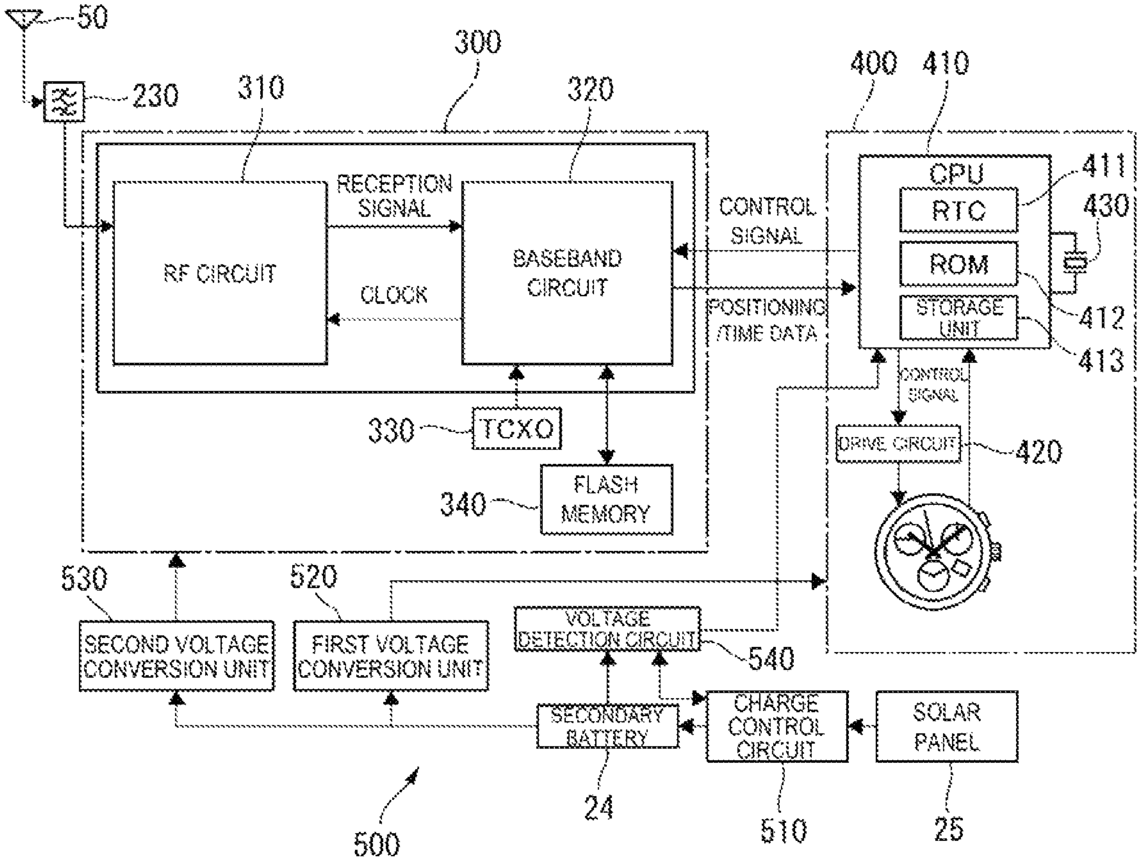
FIG. 7 is a block diagram illustrating a circuit configuration of the electronic watch.

FIG. 7 is a block diagram illustrating a circuit configuration of the electronic watch 1.

The electronic watch 1 includes a GPS reception unit 300 disposed at the printed wired board 70, a control display unit 400, and a power supply unit 500.

GPS Reception Unit

The GPS reception unit 300 receives and processes satellite signals from GPS satellites through the planar antenna 50 and a SAW filter 230. The SAW filter 230 is a band pass filter, and passes through a satellite signal of 1.5 GHZ. Note that an LNA that improves the reception sensitivity may be additionally disposed between the planar antenna 50 and the SAW filter 230. Alternatively, the SAW filter 230 may be incorporated into the GPS reception unit 300. Note that SAW is an abbreviation for Surface Acoustic Wave, and LNA is an abbreviation for Low Noise Amplifier.

The GPS reception unit 300 processes the satellite signal having passed through the SAW filter 230, and includes an RF circuit 310, a baseband circuit 320, a crystal oscillation circuit 330 with a temperature compensation circuit, and a flash memory 340. Note that RF is an abbreviation for Radio Frequency. Further, the crystal oscillation circuit 330 is denoted as TCXO in FIG. 7.

The RF circuit 310 is typical as an RF unit for GPS reception with a PLL, a VCO, an LNA, a mixer, an IF amplifier, an IF filter, an A/D converter, and the like. Note that PLL is an abbreviation for Phase Locked Loop, VCO is an abbreviation for Voltage Controlled Oscillator, and IF is an abbreviation for Intermediate Frequency.

The baseband circuit 320 is typical as a baseband unit for GPS reception with a DSP, a CPU, an RTC, an SRAM, and the like. The TCXO 330 and the flash memory 340 are also coupled to the baseband circuit 320. Note that DSP is an abbreviation for Digital Signal Processing, CPU is an abbreviation for Central Processing Unit, RTC is an abbreviation for Real Time Clock, and SRAM is an abbreviation for the State Random Access Memory.

The baseband circuit 320 is input with a reception signal converted into a digital signal from the RF circuit 310, performs correlation processing, positioning computation, and the like, acquires satellite time information and positioning data, corrects the acquired satellite time information, that is, a Z count by using leap seconds stored in the SRAM, and calculates UTC that is coordinated universal time being time data. Thus, the baseband circuit 320 outputs the positioning data and the time data to the control unit 410.

A clock that is a base of local oscillation signals is supplied from the TCXO 330 to the RF circuit 310 via the baseband circuit 320.

The flash memory 340 stores a time difference database in which position information identified by a latitude and a longitude is associated with time difference information of the location, and the like. When the GPS reception unit 300 acquires position information in a positioning mode, the GPS reception unit 300 acquires time difference information, that is, a time difference with respect to UTC based on the position information (the latitude, the longitude), and outputs the time difference information to the control unit 410.

Control Display Unit

The control display unit 400 includes the control unit (CPU) 410, a drive circuit 420 that drives the hands and the like, and a crystal oscillator 430.

The control unit 410 includes an RTC 411, a ROM 412, and a storage unit 413, and clocks the time and outputs a control signal to the GPS reception unit 300 to control the operation.

The RTC 411 clocks the internal time by using a reference signal output from the crystal oscillator 430. The ROM 412 stores various programs to be executed by the control unit 410. In the present embodiment, the internal time to be clocked by the RTC 411 is UTC that is coordinated universal time. The control unit 410 updates the RTC 411 by using the UTC output from the GPS reception unit 300 when reception is succeeded in the timing mode or the positioning mode.

The storage unit 413 stores the satellite time information, the positioning information, and the time difference information that are output from the GPS reception unit 300. Thus, the control unit 410 calculates the time at the current location by using the UTC and the time difference information, and drives the drive mechanism 23 by the drive circuit 420 to indicate the calculated time by using the hour hand 31, the minute hand 32, and the seconds hand 33.

Power Supply Unit

The power supply unit 500 supplies power to the GPS reception unit 300 and the control display unit 400, and includes the solar panel 25, a charge control circuit 510, the secondary battery 24, a first voltage conversion unit 520, a second voltage conversion unit 530, and a voltage detection circuit 540.

The charge control circuit 510 controls so that the power generated by the solar panel 25 is charged in the secondary battery 24.

The secondary battery 24 supplies drive power to the control display unit 400 via the first voltage conversion unit 520, and supplies drive power to the GPS reception unit 300 via the second voltage conversion unit 530.

The voltage detection circuit 540 monitors the output voltage of the secondary battery 24, and outputs the output voltage to the control unit 410. Thus, the control unit 410 can grasp the voltage of the secondary battery 24 detected by the voltage detection circuit 540 and control reception processing.

Dielectric Resonator Antenna

Next, a dielectric resonator antenna (DRA) in the electronic watch 1 will be described. DRA is an abbreviation for Directive Resonator Antennas.

In a watch that performs radio frequency wireless communication, such as GPS, a function of the dielectric resonator antenna (DRA) works by using a cover glass having a high relative permittivity such as sapphire glass, causing the antenna performance to be improved. An electric field of the dielectric resonator antenna is distributed and confined in a loop shape inside the dielectric resonator having a cylindrical shape, and a magnetic field interlinking the electric field leaks out of the dielectric. A resonant frequency varies depending on a resonance mode, but is represented by the following Equation 1 in a free space as an example. The glass needs to be thick to some extent. Equation 1 is an equation representing a resonant frequency $f_0$ of the DRA having the cylindrical shape. Note that the De is a diameter of the dielectric resonator having a cylindrical shape, and h is a thickness of the dielectric resonator.

$$f_o = \frac{6.324}{\sqrt{\varepsilon_r} + 2}\left[0.27 + 0.36\left(\frac{D_c}{4h}\right) + 0.02\left(\frac{D_c}{4h}\right)\right]0.4 \le \frac{D_c}{4h} \le 0.6 \quad \text{[Equation 1]}$$

Figure 8:
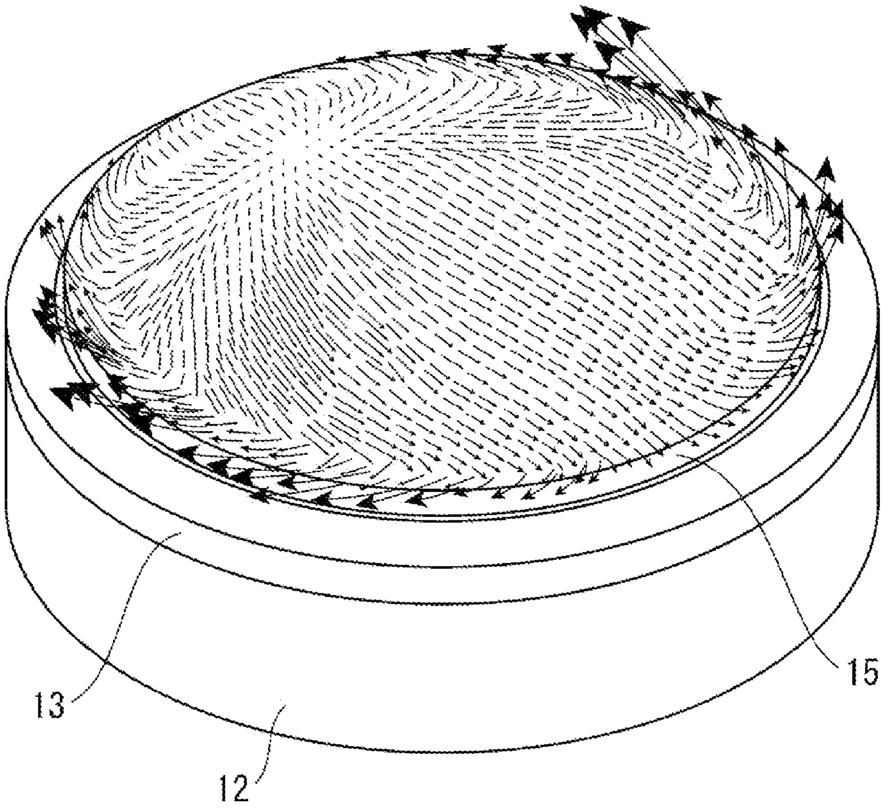
FIG. 8 is a diagram illustrating a current distribution at a cover glass of the electronic watch.

An end portion of the dielectric is important for the resonance of the DRA. In other words, as illustrated in FIG. 8, since the outer circumferential portion of the cover glass 15 is large, a current distribution at the cover glass 15 is largely affected by the glass edge at which the cover glass 15 is fixed and the bezel 13. Thus, the case 10 made of metal and attached with the cover glass 15 shields radio waves, and thus, there is a problem that antenna characteristics cannot be improved in practice only by making the cover glass 15 thicker. In order to increase the effect of the DRA, the case 10 made of metal and attached with the cover glass 15 needs to have a structure that does not shield radio waves.

In $TE_{011}$ mode resonance that is a main resonance mode of the DRA, an electric field (electric lines of force) is distributed and confined in a loop shape inside the dielectric resonator, and the magnetic field (magnetic lines of force) interlinking the electric field leaks out of the resonator. For example, when a conductor such as a microstrip line is brought close to the resonator, feeding can be performed by coupling with the magnetic field of the $TE_{011}$ mode. The magnetic field that leaks out of the resonator is the same as a magnetic field surrounding an actual current flowing in a loop coil when the loop coil is disposed along the electric field inside the resonator, and this antenna performs the same operation as that of a loop antenna. There is no conductor in this resonance system, only a dielectric loss and a radiation loss are generated, and in particular, the dielectric loss for radio frequency is smaller than a conductor loss. Thus, a smaller internal loss and a higher radiation efficiency than those of the loop antenna can be expected.

However, when metal having a certain size is present near the magnetic field of the DRA, a current that disturbs the magnetic field due to the resonance of the DRA flows into the metal, and the radiation efficiency deteriorates.

Thus, in the present embodiment, as illustrated in FIG. 2, a recessed portion 131 is formed in the bezel 13 that holds the cover glass 15, and the metal material being present near the end portion of the cover glass 15, that is, the bezel 13 is reduced.

The inner circumferential surface provided at a position below the recessed portion 131 of the bezel 13 is a facing surface 132 facing the side surface 153 of the cover glass 15 through a plastic packing 17. Also, the bezel 13 includes a support piece 133 protruding inward from the lower side of the facing surface 132. The support piece 133 is formed over the entire circumference of the facing surface 132, is in contact with the lower surface 152 of the cover glass 15, and supports the cover glass 15.

The facing surface 132 is a surface along the first direction that is the axial direction of the hand shafts 35 to 37, and is a circumferential surface along the inner circumferential surface of the bezel 13. This facing surface 132 faces the side surface 153 of the cover glass 15 and holds the cover glass 15 through the plastic packing 17. Thus, the cover glass 15 is attached to the bezel 13, that is, the case 10.

An interval L between the facing surface 132 and the side surface 153 is approximately 0.4 mm. The facing surface 132 of the bezel 13 is provided within a predetermined dimension from the side surface 153 of the cover glass 15, and is a surface facing the side surface 153. The surface facing the side surface 153 is a surface disposed so as to be substantially parallel to the side surface 153. The condition of being provided within the predetermined dimension identifies a surface disposed at a distance that largely affects the DRA. In the present embodiment, the predetermined dimension is set to 1 mm.

A height dimension that is a dimension along the first direction of the facing surface 132 is approximately 1.3 mm, and is approximately half the thickness dimension of the cover glass 15 being approximately from 2.6 to 2.8 mm. Thus, in the first direction, a height dimension H1 from an end portion of the facing surface 132 positioned farthest from the planar antenna 50, that is, an upper end portion of the facing surface 132, to the farthest portion of the cover glass 15 positioned farthest from the planar antenna 50 is approximately from 1.3 to 1.5 mm, and as will be described below, is equal to or greater than 1/60 of the wavelength shortened by the cover glass 15.

The recessed portion 131 is configured with a bottom surface 1311 extended from the inner circumferential surface of the bezel 13 having a ring shape toward the outer circumferential side, and a side surface 1312 extended downward from the front surface of the bezel 13. The side surface 1312 is a circumferential surface along the first direction. An interval between the side surface 1312 and the side surface 153 is larger than the interval L, and is, for example, approximately 2.8 mm.

Thus, the side surface 1312 of the recessed portion 131 of the bezel 13 is a surface facing the side surface 153, but is spaced apart from the side surface 153 by a predetermined dimension or more, so that the effect given to the DRA is small.

A decorative plate 18 is disposed in the recessed portion 131 of the bezel 13. The decorative plate 18 is formed in a ring shape in plan view, and is formed of a dielectric having a relative permittivity of 6 or higher such as glass or ceramic. The thickness dimension of the decorative plate 18 in FIG. 2 is, for example, 1.2 mm. Thus, the effect of the DRA can be improved compared to a case where a metal material is also disposed in the recessed portion 131 and a case where a bezel made of metal and not including the recessed portion 131 is used. That is, by providing the decorative plate 18 having no electrical conductivity in the recessed portion 131 of the bezel 13, both the design properties and antenna performance are improved.

As described above, the recessed portion 131 is formed in the bezel 13 that holds the cover glass 15, and the decorative plate 18 that is a non-conductive member is disposed in the recessed portion 131. Thus, when the planar antenna 50 receives satellite signals, the effect of resonance caused by the cover glass 15 can be obtained, which leads to the improvement of the reception sensitivity of the planar antenna 50.

Next, simulation results performed in order to check the effect of the DRA will be described with reference to the graph in FIG. 9.

Figure 9:
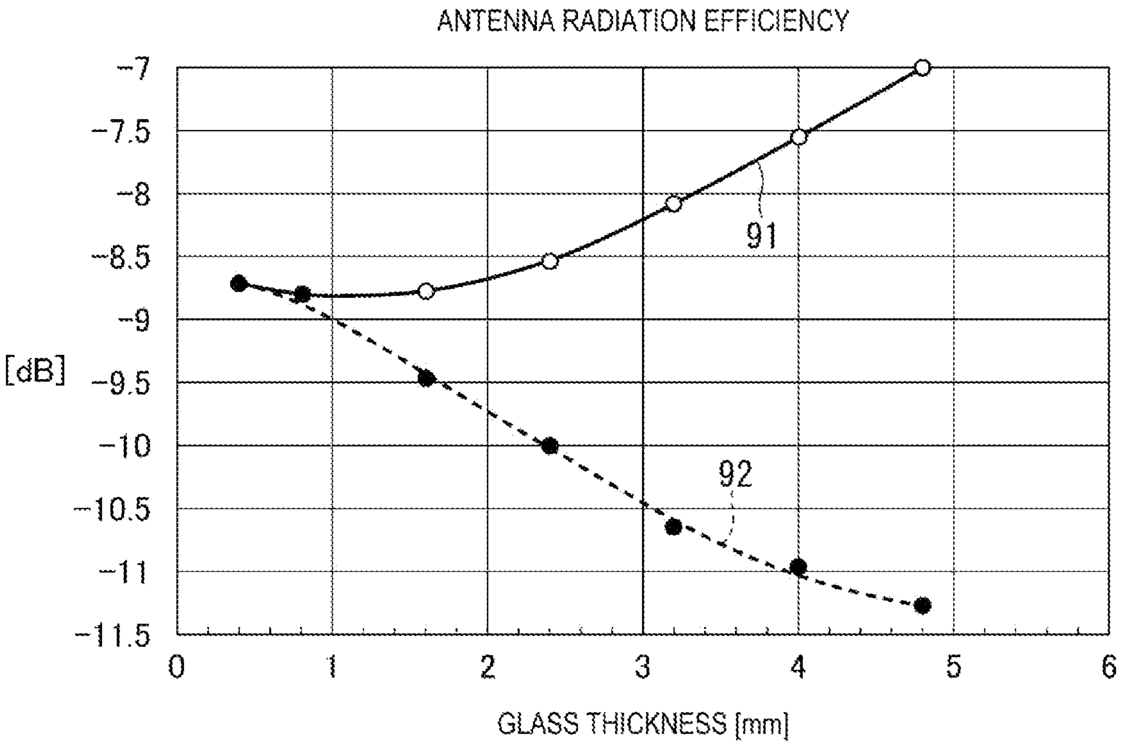
FIG. 9 is a graph illustrating a relationship between a glass thickness of the cover glass and an antenna radiation efficiency.

FIG. 9 illustrates a relationship between an antenna radiation efficiency and a glass thickness indicating the thickness dimension of the cover glass 15 formed by using sapphire glass having a relative permittivity of 10 when radio waves with a frequency of 1.575 GHz transmitted from GPS satellites are received with the planar antenna according to the first embodiment. A solid line 91 indicates a simulation result when the height dimension of the facing surface 132 that holds the cover glass 15 by providing the recessed portion 131 in the bezel 13 is maintained constant at 0.8 mm and the thickness of the cover glass 15 is changed. A dotted line 92 indicates a simulation result when the height dimension of the bezel 13 is changed according to the thickness dimension of the cover glass 15 without providing the recessed portion 131 in the bezel 13, that is, when the height of the facing surface 132 of the bezel 13 is changed so as to be approximately the same height as that of the uppermost surface of the cover glass 15.

As indicated by the dotted line 92 in FIG. 9, even though the cover glass 15 is made thick, when the bezel 13 is made thick in response to this, the antenna performance deteriorates. On the other hand, as indicated by the solid line 91 in FIG. 9, when the height of the bezel 13 is maintained constant, the antenna performance is improved as the thickness dimension of the cover glass 15 increases. In the results of FIG. 9, when the difference between the glass thickness of the cover glass 15 and the thickness dimension of the bezel 13 made of metal is larger than 1 mm, in other words, when the thickness dimension of the cover glass 15 becomes equal to or greater than 1.8 mm and the height dimension H1 in FIG. 2 becomes equal to or greater than 1 mm with respect to the height dimension of the facing surface 132 of the bezel 13 that is 0.8 mm, the antenna performance is improved. That is, in order to obtain the effect of the resonance of the DRA, it can be seen that the upper surface 151 of the cover glass 15 is required to be separated from the upper end portion of the facing surface 132 of the bezel 13 made of metal to make the height dimension H1 large.

Here, when the relative permittivity of a medium is large, the wavelength shortening equation is expressed by Equation 2. Note that $\lambda_0$ is a free space wavelength, and $\varepsilon_r$ is the relative permittivity of a dielectric.

$$\lambda=\lambda_0/\sqrt{\varepsilon_r} \quad \text{[Equation 2]}$$

The wavelength $\lambda_0$ of a radio wave with a frequency of 1.575 GHz is approximately 190 mm, and the relative permittivity $\varepsilon_r$ of the cover glass 15 is 10, and thus, the shortened wavelength λ is approximately 60.1 mm by using Equation 2. Thus, 1 mm is 0.0167 times the shortened wavelength λ (≈1/60). Since the height dimension H1 from the upper end portion of the facing surface 132 described above to the farthest portion positioned farthest from the planar antenna 50 of the cover glass 15 is equal to or greater than a dimension from 1.3 to 1.5 mm, the height dimension H1 is a dimension being equal to or greater than 1/60 of the wavelength shortened by the cover glass 15.

Note that, since the upper surface 151 of the cover glass 15 is a flat surface, a distance from the planar antenna 50 in the first direction is the same at any position of the upper surface 151, and the entire upper surface 151 is the farthest portion.

As in the second and third embodiments, which will be described below, when the cover glass is a spherical glass, the upper surface of the cover glass is curved upward, so that the uppermost portion of the cover glass is higher than the upper surface of the bezel, and in this case, the effect of the DRA is also obtained. In this case, there is no need to use a special bezel 13 including the recessed portion 131, and the degree of freedom in design is increased.

It has been previously mentioned that the glass thickness is required to be larger to some extent in order to utilize the effect of the DRA in the resonance of the cover glass 15 in order to utilize the effect of the DRA. In the simulation results illustrated in FIG. 9, when the glass thickness exceeds 2 mm, as indicated by the solid line 91, the antenna performance is improved. Here, the wavelength A shortened by the cover glass 15 is 60.1 mm, and the glass thickness of 2 mm is 0.033 times (~1/30) the shortened wavelength A. Thus, the maximum thickness dimension of the cover glass 15 is preferably equal to or greater than 1/30 of the wavelength shortened by the cover glass 15.

Figure 10:
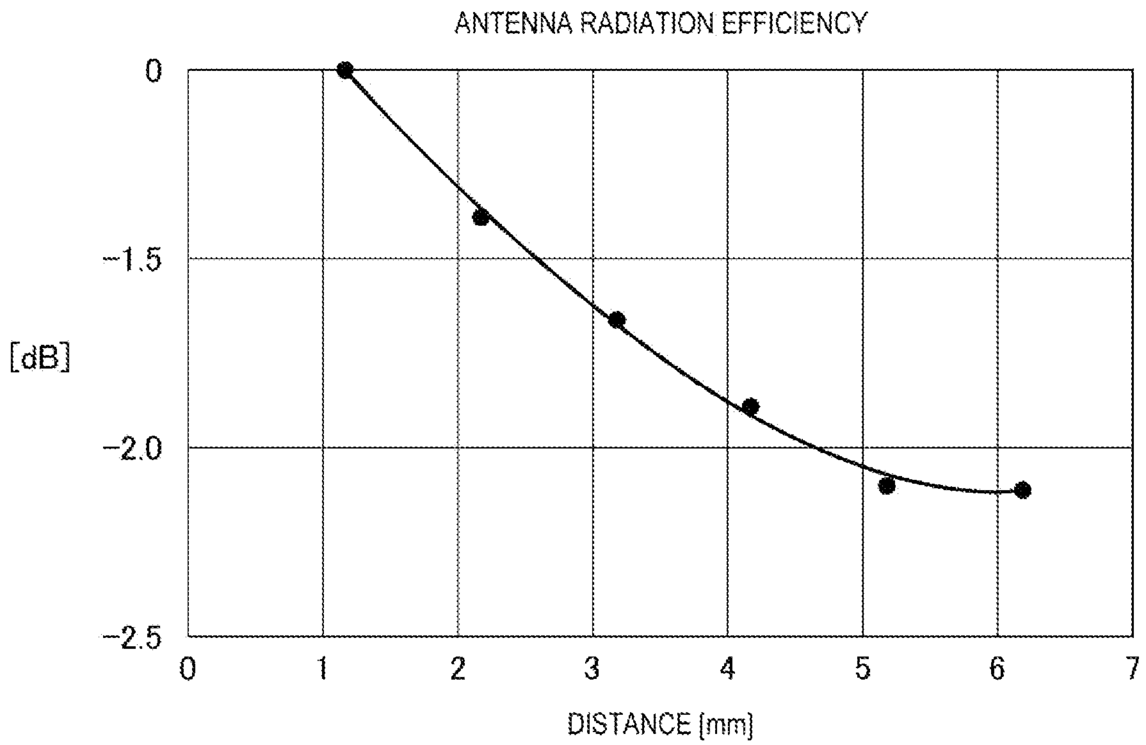
FIG. 10 is a graph illustrating a relationship between a distance between the cover glass and the planar antenna and an antenna radiation efficiency.

Here, in order to check the effect of a distance between the cover glass 15 and the planar antenna 50 on the reception characteristics, a change in antenna gain due to a placement position of the cover glass 15 in the electronic watch 1 was investigated. FIG. 10 is a graph illustrating a result obtained by simulating a change in antenna radiation efficiency when a distance H between the cover glass 15 and the planar antenna 50 in the first direction is changed. Note that, as illustrated in FIG. 2, the distance H between the cover glass 15 and the planar antenna 50 is a distance between the upper surface of the planar antenna 50, that is, the upper surface of the first conductor element 52, and the lower surface of the cover glass 15 that is a dielectric. The distance H needs to be set such that the hand disposed closest to the cover glass 15 side among the hands is not in contact with the cover glass 15. In the general specifications of a watch with three hands of an hour hand, a minute hand, and a seconds hand, the minimum value of the distance H is approximately from 1.2 to 1.3 mm.

In FIG. 10, with the case where the distance H is 1.3 mm as a reference, that is, 0 dB, the antenna radiation efficiency is indicated when the distance H increases.

As illustrated in FIG. 10, the smaller the distance H is, that is, the closer to the planar antenna 50 the cover glass 15 is positioned, the better the antenna performance is. This is because electromagnetic coupling between the cover glass 15 and the planar antenna 50 is enhanced.

The result obtained by simulating the antenna radiation efficiency of the planar antenna 50 when the cover glass 15 was not provided was equivalent to the result when the distance H was set to 4.5 mm. Thus, when the distance H is set to be equal to or less than 4.5 mm, the antenna gain can be improved by the cover glass 15. Here, the wavelength $\lambda_0$ of a radio wave transmitted from a GPS satellite is approximately 190 mm. 190 mm: 4.5 mm=about 42, and thereby, the distance H may be set to be equal to or less than 1/42 the wavelength $\lambda_0$.

Operations and Effects of First Embodiment

According to the electronic watch 1 according to the present embodiment, the recessed portion 131 is formed in the bezel 13, and the height dimension H1 from the upper end portion of the facing surface 132 of the bezel 13 to the upper surface 151 of the cover glass 15 is set to be equal to or greater than 1/60 of the wavelength of the radio wave shortened by the cover glass 15, specifically, equal to or greater than 1 mm. Thus, the antenna radiation efficiency of the planar antenna 50 can be improved, and the antenna performance of the planar antenna 50 can be improved as compared to the case where the facing surface 132 of the bezel 13 made of metal has the same thickness dimension as the thickness dimension of the cover glass 15. Since the thickness dimension of the cover glass 15 is equal to or greater than 1/30 of the wavelength of the radio wave shortened by the cover glass 15, specifically, equal to or greater than 2 mm, the effect of the DRA can be further enhanced, and the antenna performance can be further improved.

As the cover glass 15, sapphire glass having a relative permittivity of approximately from 9 to 11 is used, and thus, the effect of the DRA can be enhanced, and the antenna performance can be further improved.

Additionally, the decorative plate 18 disposed in the recessed portion 131 is formed of a dielectric having a relative permittivity of 6 or higher, and thus, the effect of the DRA can be enhanced, and both the design properties and the antenna performance can be improved.

The electronic watch 1 uses the planar antenna 50, and the planar antenna 50 has a large area overlapping the cover glass 15 in plan view compared to other antennas such as annular antennas or patch antennas, which will be described below. Thus, the effect of the DRA can be enhanced as compared to other antennas.

The dielectric substrate 51 of the planar antenna 50 also serves as the recessed portion 51C that accommodates the LED substrate 60, a date indicator maintaining plate that maintains the date indicator 5, and the component of the movement 20 such as the support substrate of the solar panel 25, improving the degree of freedom in movement design. Thus, it is advantageous for minimizing and thinning the electronic watch 1. On the other hand, the dielectric substrate 51 does not need to achieve other functions, and may be a component dedicated to a planar antenna.

The first magnetic shield plate 26 also serves as a ground member of the planar antenna 50 and an hour wheel holder, so that the degree of freedom in movement design is further improved, and it is advantageous for minimizing and thinning the electronic watch 1.

The LED substrate 60 is accommodated in the recessed portion 51C of the dielectric substrate 51, and is disposed at substantially the same height as that of the dielectric substrate 51, so that the thickness dimension of the movement 20 can be reduced, and the electronic watch 1 can be thinned.

The solar panel 25 is disposed at substantially the entire surface at the front surface side of the planar antenna 50, and thus, the power generation area can be increased.

Second Embodiment

Figure 11:
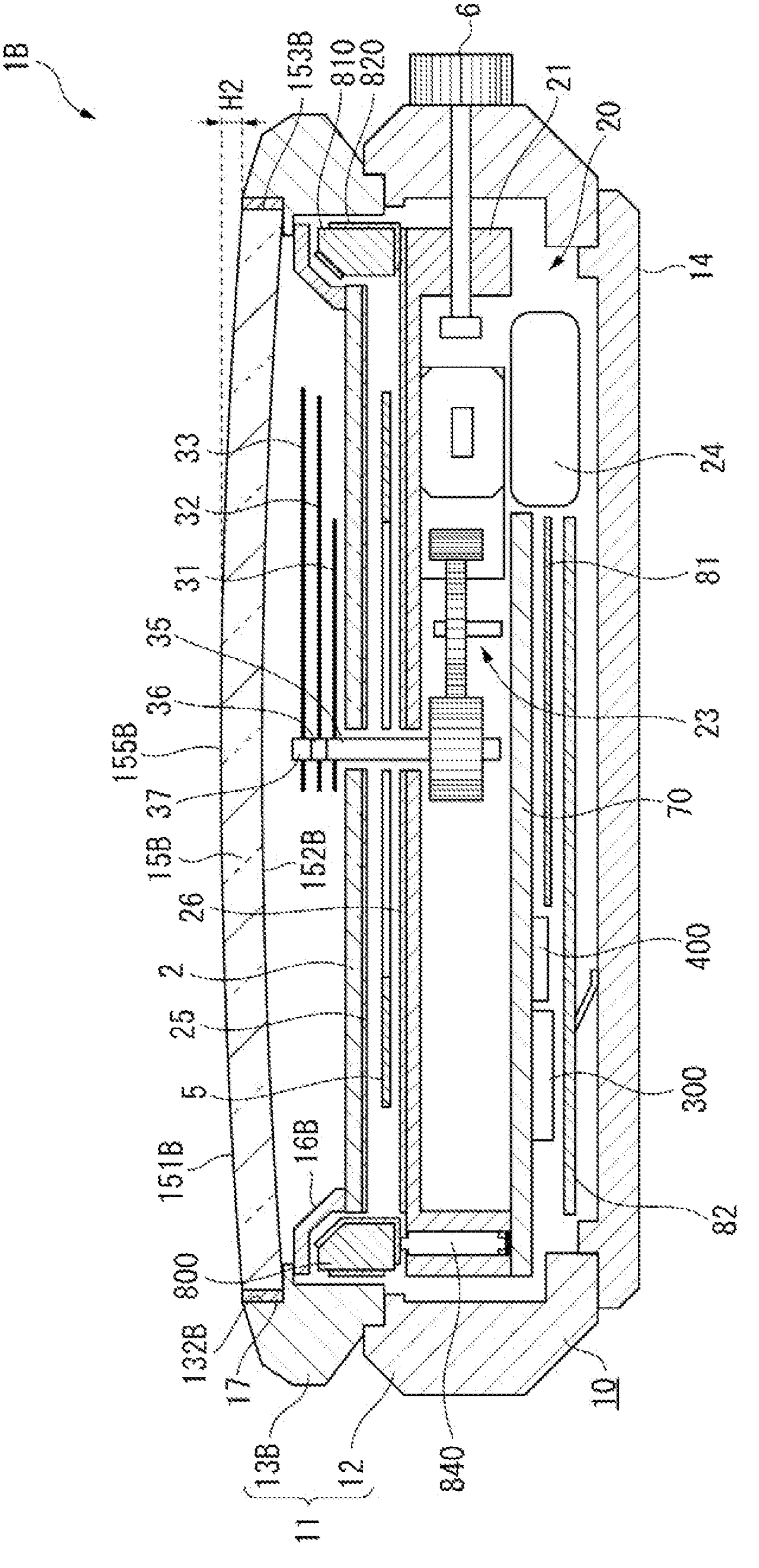
FIG. 11 is a cross-sectional view illustrating an electronic watch according to a second embodiment.

Next, an electronic watch 1B according to a second embodiment, as illustrated in FIG. 11, will be described. The electronic watch 1B according to the second embodiment mainly differs in that an annular antenna 800 is used instead of the planar antenna 50, and a cover glass 15B constituted by a dual curved glass is used instead of the flat plate glass. Note that configurations similar to those in the first embodiment will be denoted by the same reference signs and descriptions will be omitted.

The annular antenna 800 is configured by forming an antenna element 820 by plating, silver paste printing, or the like to an antenna substrate 810 having an annular shape and formed of a dielectric. As a dielectric forming the antenna substrate 810, for example, a resin material having a high permittivity that is a relative permittivity of approximately from 5 to 15, such as a resin material formed by mixing a ceramic dielectric material that can be used at a high frequency such as titanium oxide with synthetic resin, can be used.

In plan view from the cover glass 15B side, the antenna element 820 is a C-shaped loop element in which a part of a ring is cut out, and converts electromagnetic waves into a current. The antenna element 820 is made conductive with the printed wired board 70 through a power feed pin 840.

The annular antenna 800 is disposed along the outer circumference of the dial 2 and the solar panel 25. In other words, the dial 2 and the solar panel 25 are disposed in the inner space of the annular antenna 800. The annular antenna 800 is covered with a dial ring 16B disposed at the inner circumferential side of the bezel 13B.

The cover glass 15B is a dual curved glass in which both an upper surface 151B and a lower surface 152B are curved surfaces. A thickness dimension of the cover glass 15B is approximately from 1.9 to 2.0 mm. The cover glass 15B is held by the bezel 13B. Note that the bezel 13B of the electronic watch 1B differs from the bezel 13 of the electronic watch 1 in that a recessed portion is not formed.

A height dimension of a side surface 153B of the cover glass 15B and a height dimension of a facing surface 132B of the bezel 13B facing the side surface 153B with the plastic packing 17 interposed therebetween are substantially the same.

In the first direction parallel to the axial direction of the hand shafts 35 to 37, the cover glass 15B side is defined as an upper side, and the case back 14 side is defined as a lower side. In this case, in the upper surface 151B of the cover glass 15B, the center position in plan view, that is, an overlapping position with the hand shafts 35 to 37, is an uppermost portion, and the uppermost portion is a farthest portion 155B positioned farthest from the annular antenna 800 in the first direction. As illustrated in FIG. 11, in the first direction, a height dimension H2 from an end portion positioned farthest from the annular antenna 800 of the facing surface 132B of the bezel 13B to the farthest portion 155B is set to be equal to or greater than 1/60 of the wavelength shortened by the cover glass 15B, specifically, equal to or greater than 1 mm.

Operations and Effects of Second Embodiment

The electronic watch 1B according to the second embodiment has the configuration similar to that of the electronic watch 1 according to the first embodiment, and thus, similar operations and effects can be achieved.

That is, in the first direction, the farthest portion 155B of the cover glass 15B is disposed at the upper side than the facing surface 132B of the bezel 13B, and the height dimension H2 is equal to or greater than 1/60 of the wavelength shortened by the cover glass 15B, so that the effect of the DRA can be utilized to improve the antenna performance.

The electronic watch 1B uses the cover glass 15B of the dual curved glass, and does not form a recessed portion in the bezel 13B, allowing the improvement of versatility in design.

Since the annular antenna 800 is disposed along the outer circumference of the dial 2, the antenna can be disposed at the front surface side from the movement 20, that is, the cover glass 15 side, so that the antenna is difficult to be affected from a component of a watch such as a step motor, allowing the improvement of the reception performance.

Third Embodiment

Figure 12:
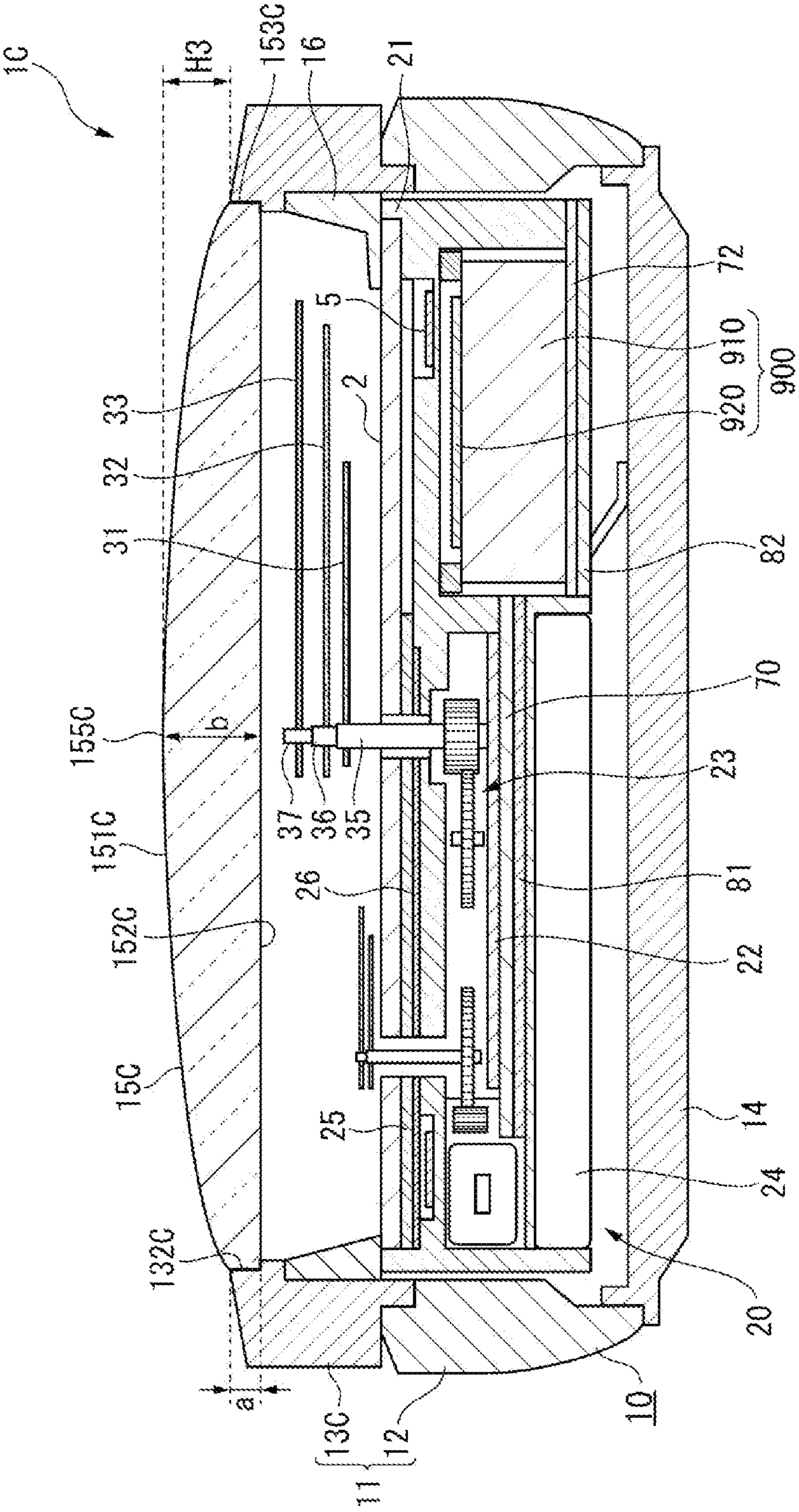
FIG. 12 is a cross-sectional view illustrating an electronic watch according to a third embodiment.

Next, an electronic watch 1C according to a third embodiment, as illustrated in FIG. 12, will be described. The electronic watch 1C according to the third embodiment mainly differs in that a patch antenna 900 is used, and a curved glass is used as a cover glass 15C. Note that configurations similar to those in the first embodiment will be denoted by the same reference signs and descriptions will be omitted.

The patch antenna 900 is a patch antenna of surface-mounting type including a dielectric substrate 910 provided with an antenna electrode 920 having electrical conductivity, a ground electrode, and a feeding electrode.

The dielectric substrate 910 is made of a rectangular ceramic, and is formed by, for example, molding barium titanate having a relative permittivity of about 100 as a primary raw material with a pressing machine, and firing.

The antenna electrode 920 is disposed at the front surface of dielectric substrate 910. The ground electrode and the feeding electrode are formed by mainly screen-printing a paste material such as silver at the back surface of the dielectric substrate 910. The ground electrode functions as a ground of the patch antenna 900, and is electrically coupled to a second printed wired board 72 that functions as a ground plate. The feeding electrode is electromagnetically coupled to the antenna electrode 920. Thus, a power feed pin that electrically couples the feeding electrode and the antenna electrode 920 does not need to be used.

When the patch antenna 900 has a rectangular shape, one side of the antenna electrode 920 resonates at the half wavelength of a radio wave. Here, since the dielectric substrate 910 is formed of a highly dielectric material, a length of the antenna electrode 920 that resonates with a radio wave due to the wavelength shortening effect can be shortened, and the patch antenna 900 can be minimized.

The cover glass 15C is constituted by a curved glass having a curved surface as an upper surface 151C and a flat surface as a lower surface 152C.

For the electronic watch 1C, the cover glass 15C side is defined as an upper side and the case back 14 side is defined as a lower side in the first direction parallel to the axial direction of the hand shafts 35 to 37. In this case, in the upper surface 151C of the cover glass 15C, the center position in plan view, that is, an overlapping position with the hand shafts 35 to 37, is an uppermost portion, and the uppermost portion is a farthest portion 155C positioned farthest from the patch antenna 900 in the first direction. Thus, as illustrated in FIG. 12, in the first direction, a height dimension H3 from an end portion positioned farthest from the patch antenna 900, of a facing surface 132C of a bezel 13C, to the farthest portion 155C is set to be equal to or greater than 1/60 of the wavelength shortened by the cover glass 15C, specifically, equal to or greater than 1 mm.

A thickness of glass that is a dielectric is required to be large in order to utilize the effect of the DRA due to the resonance of the cover glass 15C. When a height dimension of a side surface 153C of the cover glass 15C is denoted as a, and a height dimension from the lower surface 152C to the farthest portion 155C is denoted as b, the cover glass 15C according to the present embodiment has the height dimension a of 1.0 mm, and the height dimension b of 2.4 mm. A height dimension of the facing surface 132C of the bezel 13C is the same as the height dimension a of the side surface 153C of the cover glass 15C, and the height dimension H3 from the upper end of the facing surface 132C to the farthest portion 155C in the first direction is 1.4 mm. Thus, the height dimension H3 is equal to or greater than 1/60 of the shortened wavelength.

Figure 13:
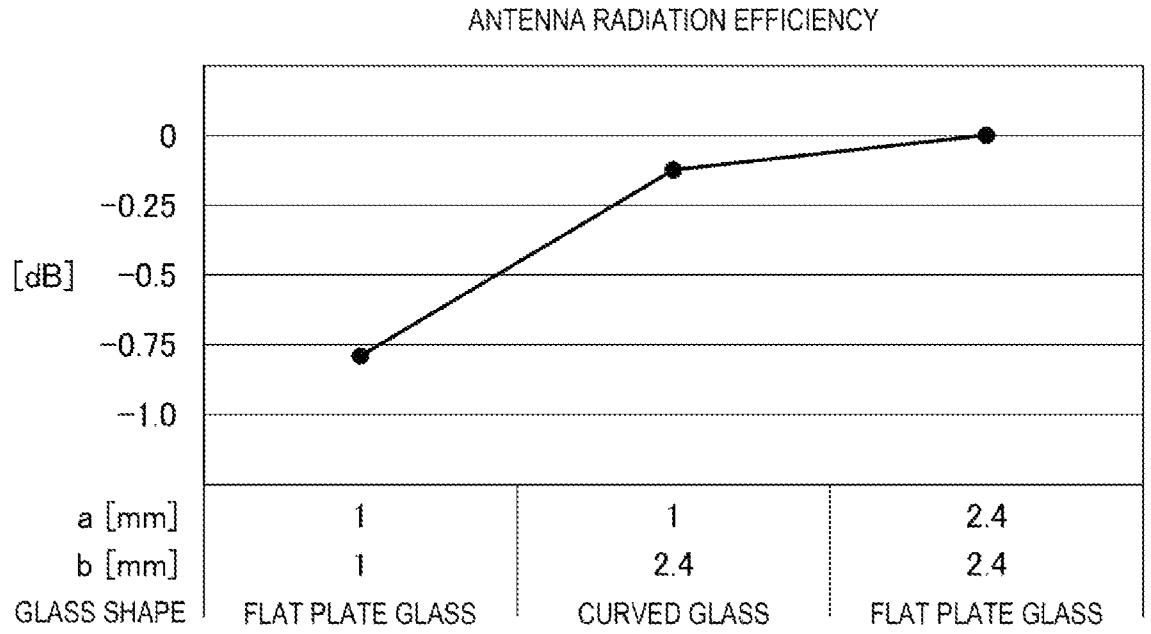
FIG. 13 is a graph illustrating a relationship between a shape and a thickness of the cover glass and an antenna radiation efficiency.

FIG. 13 is a graph illustrating a result obtained by simulating an antenna radiation efficiency due to a shape and a thickness dimension of the cover glass.

In a case where an antenna radiation efficiency when the cover glass 15 having a flat plate shape and having a thickness dimension of 2.4 mm is regarded as a reference, that is, 0 dB, FIG. 13 illustrates radiation efficiencies obtained when a cover glass having a flat plate shape and a thickness dimension of 1.0 mm is used, and when the cover glass 15C according to the third embodiment is used. As illustrated in FIG. 13, when the cover glass having the flat plate shape and having the thickness dimension of 1.0 mm is used, the radiation efficiency deteriorates compared to the case of the cover glass 15 having the flat plate shape and having the thickness dimension of 2.4 mm, but when the cover glass 15C is used, the radiation efficiency is substantially the same as the radiation efficiency when the cover glass 15 having the flat plate shape and having the thickness dimension of 2.4 mm is used. That is, even when the thickness of the side surface 153C that is the end portion is made as thin as 1.0 mm, as long as the thickness of the glass at the center portion is made as thick as 2.4 mm, using the cover glass 15C results in obtaining substantially the same antenna performance as that of the flat plate glass having the thickness of 2.4 mm. Thus, by using the cover glass 15C constituted by the curved glass, even when the cover glass 15C is held by the bezel 13C made of metal, the effect can be sufficiently reduced.

Operations and Effects of Third Embodiment

When the electronic watch 1C according to the third embodiment has the configuration similar to that of the electronic watch 1 according to the first embodiment, similar operations and effects can be exhibited.

That is, in the first direction, the farthest portion 155C of the cover glass 15C is disposed at the upper side from the facing surface 132C of the bezel 13C, and the height dimension H3 is equal to or greater than 1/60 of the wavelength shortened by the cover glass 15C, so that the antenna performance can be improved by utilizing the effect of the DRA.

In the electronic watch 1C, the cover glass 15C of the curved glass is used, and a recessed portion is not formed in the bezel 13C, allowing the improvement of versatility in design. Also, since the electronic watch 1C uses the curved glass, the end portion of the cover glass 15C can be thinned, and in terms of design, the electronic watch 1C can be made to appear thin.

The patch antenna 900 is small in size in plan view, and thus, can be disposed at a position where the patch antenna 900 does not overlap the secondary battery 24, the step motors 231 to 234, the train wheels, and the like in plan view. As a result, it is advantageous for miniaturizing and thinning the electronic watch 1C.

Other Embodiments

Note that the present disclosure is not limited to the embodiments described above, and various modifications can be made within the scope of the present disclosure.

The combinations of the types of the cover glasses and the types of the antennas are not limited to the combinations in the embodiments described above. For example, the annular antenna 800 and the patch antenna 900 may be incorporated into the electronic watch 1 including the cover glass 15 of the flat plate glass. Also, the planar antenna 50 and the patch antenna 900 may be incorporated into the electronic watch 1B including the cover glass 15B being the dual curved glass. Furthermore, the planar antenna 50 and the annular antenna 800 may be incorporated into the electronic watch 1C including the cover glass 15C being the curved glass.

The cover member is not limited to sapphire glass, and a dielectric having a relative permittivity of 6 or higher and having characteristics required as a cover member for an electronic watch may be used.

The electronic watch may include a rotating bezel. In this case, even in a case where the rotating bezel itself does not hold the cover glass 15, when the rotating bezel includes a facing surface facing the side surface 153 of the cover glass 15, and the facing surface is provided within a predetermined distance from the side surface 153, a height dimension from the end portion, of the facing surface of the rotating bezel, positioned farthest from the antenna to the farthest portion of the cover member positioned farthest from the antenna may be configured to be equal to or greater than 1/60 of the wavelength shortened by the cover member.

In addition, the bezels 13B and 13C of the electronic watches 1B and 1C may be formed with a recessed portion, similarly to the bezel 13, and may be provided with a decorative plate.

In the first embodiment, the planar antenna 50 is configured so as to include the first magnetic shield plate 26, but the present disclosure is not limited thereto. The second conductor element 53 may be formed in a plate shape with substantially the same area as that of the first conductor element 52, and may function as a ground member of the planar inverted-F antenna.

In each of the embodiments, the antenna receives satellite signals transmitted from GPS satellites, but a signal to be received by the antenna is not limited thereto. For example, the antenna may receive a satellite signal transmitted from each of satellites, such as other global navigation satellite systems (GNSS) such as Galileo, GLONASS, and Beidou, satellite-based augmentation systems (SBAS), and regional navigation satellite systems (RNSS) that can be retrieved only in specific regions such as quasi-zenith satellites.

The antenna is not limited to an antenna that receives a satellite signal, and may be, for example, an antenna that receives another radio wave such as Bluetooth (registered trademark), Bluetooth Low Energy (BLE), Wi-Fi (registered trademark), Near Field Communication (NFC), or Low Power Wide Area (LPWA). In other words, as the antennas incorporated in the electronic watches 1, 1B, and 1C, appropriate antennas may be used depending on types of reception signals, sizes of the watches, favorable placement with other components, and the like.

Summary of Present Disclosure

An electronic watch according to the present disclosure includes a case having electrical conductivity, a cover member attached to the case, a hand, a hand shaft to which the hand is attached, and an antenna disposed to overlap the cover member in plan view from a first direction parallel to an axial direction of the hand shaft, the antenna being configured to receive a predetermined radio wave, the cover member is made of a material that shortens a wavelength of the radio wave, the case includes a facing surface facing a side surface of the cover member, the facing surface being disposed within a predetermined dimension from the side surface, and in the first direction, a height dimension from an end portion of the facing surface positioned farthest from the antenna to a farthest portion of the cover member positioned farthest from the antenna is equal to or greater than 1/60 of the wavelength shortened by the cover member.

According to the electronic watch according to the present disclosure, the cover member is configured by using the material that shortens the wavelength of the radio wave, and the height dimension from the end portion positioned farthest from the antenna, of the facing surface of the case to which the cover member is attached, to the farthest portion of the cover member positioned farthest from the antenna is made to be equal to or greater than 1/60 of the wavelength shortened by the cover member, that is, the cover member includes a portion protruding upward from the facing surface of the case in the first direction. Thus, the function of the dielectric resonator antenna using the cover member can be effectively exerted, and the radiation efficiency of the antenna can be improved.

The electronic watch according to the present disclosure preferably includes a dial, a drive mechanism configured to drive the hand, and a main plate attached with the drive mechanism, and the antenna includes a conductor element having a plate shape, the conductor element including a through hole through which the hand shaft is inserted, and the antenna is preferably disposed between the dial and the main plate in side view when viewed from a second direction orthogonal to the first direction.

According to the electronic watch according to the present disclosure, the antenna is disposed between the dial and the main plate, and also includes the through hole through which the hand shaft is inserted, and thus, can ensure, in plan view, substantially the same area as that of the dial. Thus, an area overlapping the cover member in plan view can be increased, and electromagnetic coupling with the cover member can also be enhanced, allowing the improvement of the antenna performance.

In the electronic watch according to the present disclosure, the maximum thickness dimension of the cover member is preferably equal to or greater than 1/30 of the wavelength shortened by the cover member.

According to the electronic watch according to the present disclosure, the maximum thickness dimension of the cover member is made thick so as to be equal to or greater than 1/30 of the wavelength shortened by the cover member. Thus, the effect of the DRA can be enhanced, and the antenna performance can be improved.

In the electronic watch according to the present disclosure, the cover member is preferably made of a dielectric having a relative permittivity of 6 or higher.

According to the electronic watch according to the present disclosure, the relative permittivity of the cover member is high. Thus, the effect of the DRA can be enhanced, and the antenna performance can be improved.

In the electronic watch according to the present disclosure, the case includes a recessed portion opened to the facing surface and the front surface of the case, and a decorative plate having no electrical conductivity is preferably disposed in the recessed portion.

According to the electronic watch according to the present disclosure, the case is formed with the facing surface and the recessed portion opened to the front surface of the case. Thus, a height position of the uppermost portion of the facing surface can be lowered, and the height dimension from the facing surface to the farthest portion of the cover member can be ensured. As a result, the effect of the case made of a conductive member at the outer edge portion of the cover member can be reduced, and the effect of the DRA can be enhanced, allowing the improvement of the antenna performance.

In the electronic watch according to the present disclosure, the decorative plate preferably includes a dielectric having a relative permittivity of 6 or higher.

According to the electronic watch according to the present disclosure, the relative permittivity of the decorative plate is high, allowing the improvement of the reception sensitivity of the antenna.

An electronic watch according to the present disclosure includes a case having electrical conductivity, a cover member attached to the case, a hand, a hand shaft to which the hand is attached, and an antenna disposed to overlap the cover member in plan view from a first direction parallel to an axial direction of the hand shaft, the antenna being configured to receive a predetermined radio wave, the cover member is made of a material that shortens a wavelength of the radio wave, the case includes a facing surface facing a side surface of the cover member, the facing surface being disposed within a predetermined dimension from the side surface, and a recessed portion opened to the facing surface and a front surface of the case, the recessed portion is disposed with a decorative plate having no electrical conductivity, and in the first direction, a farthest portion of the cover member positioned farthest from the antenna is positioned farther from the antenna than an end portion of the facing surface positioned farthest from the antenna.

According to the electronic watch according to the present disclosure, the case is formed with the facing surface and the recessed portion opened to the front surface of the case. Thus, a height position of the uppermost portion of the facing surface can be lowered, and the height dimension from the facing surface to the farthest portion of the cover member can be ensured. As a result, the effect of the case made of a conductive member at the outer edge portion of the cover member can be reduced, and the effect of the DRA can be enhanced, allowing the improvement of the antenna performance.

What is claimed is:

1. An electronic watch, comprising:
- a case having electrical conductivity;
- a cover member attached to the case;
- a hand;
- a hand shaft to which the hand is attached; and
- an antenna disposed so as to overlap the cover member in plan view when viewed from a first direction parallel to an axial direction of the hand shaft, the antenna being configured to receive a predetermined radio wave, wherein
- the cover member is made of a material configured to shorten a wavelength of the radio wave,
- the case includes a facing surface facing a side surface of the cover member, the facing surface being located within a predetermined dimension from the side surface,
- the case includes a recessed portion opened to the facing surface and to a front surface of the case, and the recessed portion is provided with a decorative plate having no electrical conductivity, and
- in the first direction, a height dimension from an end portion positioned farthest from the antenna in the facing surface to a farthest portion positioned farthest from the antenna in the cover member is equal to or greater than 1/60 of the wavelength shortened by the cover member.

2. The electronic watch according to claim 1, comprising:
- a dial;
- a drive mechanism configured to drive the hand; and
- a main plate to which the drive mechanism is attached, wherein
- the antenna includes a conductor element having a plate shape, the conductor element including a through hole through which the hand shaft is inserted, and
- the antenna is disposed between the dial and the main plate in side view when viewed from a second direction orthogonal to the first direction.

3. The electronic watch according to claim 1, wherein
- a maximum thickness dimension of the cover member is equal to or greater than 1/30 of the wavelength shortened by the cover member.

4. The electronic watch according to claim 1, wherein
- the cover member is made of a dielectric with a relative permittivity of 6 or higher.

5. The electronic watch according to claim 1, wherein
- the decorative plate is made of a dielectric with a relative permittivity of 6 or higher.

6. The electronic watch according to claim 1, wherein there is no metal part on a side farther from the antenna than the end portion on a same plane as the facing surface.

7. An electronic watch comprising:
- a case having electrical conductivity;
- a cover member attached to the case;
- a hand;
- a hand shaft to which the hand is attached; and
- an antenna disposed so as to overlap the cover member in plan view when viewed from a first direction parallel to an axial direction of the hand shaft, the antenna being configured to receive a predetermined radio wave, wherein
- the cover member is made of a material configured to shorten a wavelength of the radio wave,
- the case includes a facing surface facing a side surface of the cover member and located within a predetermined dimension from the side surface, and a recessed portion opened to the facing surface and to a front surface of the case, the recessed portion is provided with a decorative plate having no electrical conductivity, and in the first direction, a farthest portion positioned farthest from the antenna in the cover member is positioned farther from the antenna than an end portion positioned farthest from the antenna in the facing surface.

* * * * *